US009963322B2

(12) United States Patent
Hakonen et al.

(10) Patent No.: US 9,963,322 B2
(45) Date of Patent: May 8, 2018

(54) MONITORING TRAFFIC UNITS SERVED BY ELEVATOR VIA RADIO SIGNALS TRANSMITTED ACROSS DOORWAY OF AN ELEVATOR

(71) Applicants: Henri Hakonen, Espoo (FI); Janne Sorsa, Helsinki (FI); Juha-Matti Kuusinen, Helsinki (FI); Marja-Liisa Siikonen, Helsinki (FI)

(72) Inventors: Henri Hakonen, Espoo (FI); Janne Sorsa, Helsinki (FI); Juha-Matti Kuusinen, Helsinki (FI); Marja-Liisa Siikonen, Helsinki (FI)

(73) Assignee: KONE CORPORATION, Helsinki (FI)

(*) Notice: Subject to any disclaimer, the term of this patent is extended or adjusted under 35 U.S.C. 154(b) by 314 days.

(21) Appl. No.: 14/825,867

(22) Filed: Aug. 13, 2015

(65) Prior Publication Data
US 2015/0344265 A1    Dec. 3, 2015

Related U.S. Application Data

(63) Continuation of application No. PCT/FI2013/050239, filed on Mar. 5, 2013.

(51) Int. Cl.
*B66B 1/34* (2006.01)
*H04B 17/318* (2015.01)
(Continued)

(52) U.S. Cl.
CPC ............ *B66B 1/3476* (2013.01); *B66B 13/26* (2013.01); *H04B 17/318* (2015.01); *H04W 4/043* (2013.01)

(58) Field of Classification Search
CPC ..... B66B 1/3476; B66B 13/26; H04B 17/318; H04W 4/043
(Continued)

(56) References Cited

U.S. PATENT DOCUMENTS 4,029,176 A * 6/1977 Mills ...................... B66B 13/26
                                                        187/317
4,044,860 A * 8/1977 Kaneko .................... B66B 1/34
                                                        187/392
(Continued)

FOREIGN PATENT DOCUMENTS

CN        1361745 A     7/2002
CN      101316780 A    12/2008
(Continued)

OTHER PUBLICATIONS

Chinese Office Action dated Jun. 3, 2016 issued in corresponding Chinese Application No. 2013800735406 (with English translation).
(Continued)

*Primary Examiner* — Anthony Salata
(74) *Attorney, Agent, or Firm* — Harness, Dickey & Pierce, PLC

(57) ABSTRACT

Radio signals are communicated on spatially separate radio paths across a doorway of an elevator. Signal strengths of the radio signals are measured and used to determine traffic served by the elevator. In this way traffic boarding and leaving the elevator may be measured when more than one unit of traffic, for example people, pass through the doorway simultaneously.

17 Claims, 3 Drawing Sheets

(51) Int. Cl.
*H04W 4/04* (2009.01)
*B66B 13/26* (2006.01)

(58) Field of Classification Search
USPC ......... 187/247, 316, 317, 391–393; 160/118; 340/554, 572.1; 342/28, 61, 114; 49/26, 49/28
See application file for complete search history.

(56) References Cited

U.S. PATENT DOCUMENTS

| | | | |
|---|---|---|---|
| 4,112,419 A * | 9/1978 | Kinoshita | B66B 1/3476 187/392 |
| 4,317,117 A * | 2/1982 | Chasek | G01S 13/86 340/933 |
| 4,520,343 A * | 5/1985 | Koh | G08B 19/00 187/391 |
| 4,621,452 A * | 11/1986 | Deeg | E05F 15/43 187/317 |
| 4,742,549 A * | 5/1988 | Roschier | H03K 17/943 187/317 |
| 4,800,386 A * | 1/1989 | Kulju | G01S 13/56 187/392 |
| 4,827,264 A * | 5/1989 | Bjelk | G01S 13/56 342/61 |
| 4,874,063 A * | 10/1989 | Taylor | B66B 5/0006 187/391 |
| 5,298,697 A * | 3/1994 | Suzuki | B66B 1/20 187/380 |
| 5,487,451 A * | 1/1996 | Hughes | B66B 1/18 187/392 |
| 6,369,747 B1 * | 4/2002 | Ashihara | G01S 7/4004 342/165 |
| 6,507,278 B1 * | 1/2003 | Brunetti | B64F 1/366 340/5.3 |
| 6,720,874 B2 * | 4/2004 | Fufido | G07C 9/00031 340/5.2 |
| 7,140,469 B2 * | 11/2006 | Deplazes | B66B 1/3476 187/316 |
| 7,221,118 B2 | 5/2007 | Sasaki et al. | |
| 7,362,224 B2 * | 4/2008 | Zambon | G01J 5/14 250/342 |
| RE41,674 E | 9/2010 | Sasaki et al. | |
| 8,510,990 B2 * | 8/2013 | Agam | G01S 15/04 49/26 |
| 8,866,663 B2 * | 10/2014 | Aharony | G01S 13/003 342/107 |
| 9,122,908 B2 * | 9/2015 | Lin | G06K 9/00201 |
| 9,212,028 B2 * | 12/2015 | Novak | B66B 13/26 |
| 9,341,013 B2 * | 5/2016 | Iwata | E05F 15/0004 |
| 9,734,388 B2 * | 8/2017 | Marcheselli | G06K 9/00335 |
| 2003/0179127 A1 * | 9/2003 | Wienand | G07C 9/00 342/28 |
| 2006/0037818 A1 | 2/2006 | Deplazes et al. | |
| 2006/0225352 A1 * | 10/2006 | Fischer | G07C 9/00158 49/49 |
| 2006/0267533 A1 | 11/2006 | Sasaki et al. | |
| 2007/0152871 A1 * | 7/2007 | Puglia | G01S 7/352 342/70 |

FOREIGN PATENT DOCUMENTS

| | | | |
|---|---|---|---|
| CN | 101402428 A | 4/2009 | |
| EP | 0718806 A2 * | 6/1996 | ............ G06M 1/101 |
| GB | 2453804 A | 4/2009 | |
| JP | 2006520307 A | 9/2006 | |
| JP | 2012193007 A | 10/2012 | |
| WO | WO-2006017881 A2 | 2/2006 | |
| WO | WO-2008013515 A2 | 1/2008 | |

OTHER PUBLICATIONS

International Search Report PCT/ISA/210 for International Application No. PCT/FI2013/050239 dated Dec. 2, 2013.

* cited by examiner

US 9,963,322 B2

MONITORING TRAFFIC UNITS SERVED BY ELEVATOR VIA RADIO SIGNALS TRANSMITTED ACROSS DOORWAY OF AN ELEVATOR

This application is a continuation of PCT International Application No. PCT/FI2013/050239 which has an International filing date of Mar. 5, 2013, the entire contents of which are incorporated herein by reference.

FIELD

The present invention relates to a doorway of an elevator and more particularly to a doorway through which people board and leave an elevator.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Conventional doorways of elevators may be equipped with photocells that provide information of people passing through a doorway. When a person passes close to a photocell, no light is received by the photocell and detection of a person either boarding or leaving the elevator may be made.

When the elevator experiences high traffic, more than one person may pass through the doorway at a time. Since already a single person may cause the blocking of the photocell, further persons passing through the doorway simultaneously cannot be detected by the photocell.

Load of an elevator car can be measured by mass on board the elevator car. A number of passengers aboard the elevator car may be estimated from the load by measuring a total load of the elevator car at arrival and departure to landing zone of the elevator and a minimum load during the stoppage of the elevator car. The number of passengers obtained in this way has inaccuracy due to an assumption that before any passengers aboard the elevator, passengers that are destined to the landing zone first leave the elevator car. Further inaccuracies may be caused by differences between estimates of the mass of a single passenger and the actual masses of the passengers.

BRIEF DESCRIPTION OF THE EMBODIMENTS

According to an aspect of the invention there is provided a method comprising receiving radio signals communicated on spatially separated radio paths across a doorway of an elevator, measuring signal strength of the radio signals, and determining a number of traffic units served by the elevator on the basis of the amount of attenuation of the measured signal strengths.

According to an aspect there is provided an arrangement for monitoring traffic of an elevator comprising a doorway of an elevator, where at least one radio transmitter and at least one radio receiver have been arranged to communicate across the doorway on spatially separated radio paths.

According to an aspect there is provided an arrangement according to an aspect, said arrangement including means to perform a method according to an aspect.

According to another aspect of the invention there is provided an arrangement comprising at least one processor, and at least one memory including computer program code, the at least one memory and the computer program code configured to, with the at least one processor, cause the apparatus at least to perform a method according to an aspect.

According to another aspect of the invention there is provided a computer program product comprising executable code that when executed, cause execution of functions of a method according to an aspect.

Although the various aspects, embodiments and features of the invention are recited independently, it should be appreciated that all combinations of the various aspects, embodiments and features of the invention are possible and within the scope of the present invention as claimed.

Some embodiments may provide improved accuracy in monitoring traffic of an elevator, when a plurality of traffic units can simultaneously move through a doorway of the elevator.

Further advantages will become apparent from the accompanying description.

BRIEF DESCRIPTION OF THE DRAWINGS

In the following the invention will be described in greater detail by means of preferred embodiments with reference to the accompanying drawings, in which.

DETAILED DESCRIPTION OF THE EMBODIMENTS

Figure 1:
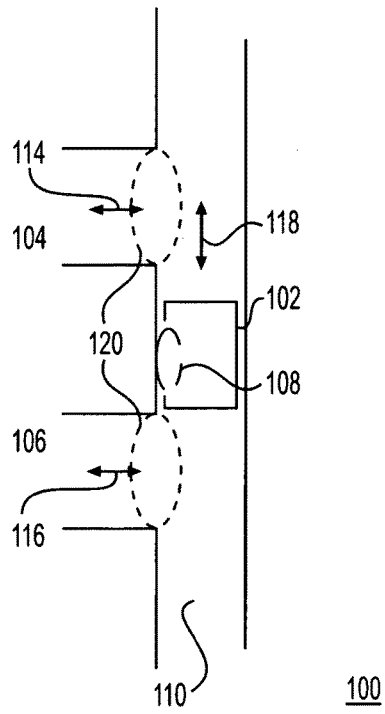
FIG. 1 illustrates an elevator for carrying out an embodiment.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following various embodiments are provided with description including references to the accompanying drawings, where like reference numerals are used to refer to like elements.

FIG. 1 illustrates an elevator 100 for carrying out an embodiment. The illustration is a cross-section of the elevator in its direction movement 118 between landing zones 104, 106. The elevator comprises an elevator car 102 and elevator landing zones 104, 106. The elevator car is moved for example by hoisting between the landing zones. The elevator car is moved in an elevator shaft that extends between the landing zones and thereby enables the elevator car to be moved to the landing zones. Arrows 118 illustrate movement of the elevator car in the elevator shaft 110.

It should be appreciated that although only two landing zones are illustrated, the elevator may comprise more landing zones as is typical in high buildings, for example block houses, towers and skyscrapers, to name a few.

The elevator car and landing zones have openings 108, 120 that allow traffic to board or leave the elevator car, when the elevator car is at the landing zone. Accordingly, each of the openings forms a doorway. When the elevator car is at the landing zone, the openings together form a doorway of the elevator allowing movement of the traffic to or from the elevator car. In one example the traffic may comprise people boarding or leaving the elevator car.

Arrows 114 and 116 on the landing zones illustrate possible movement directions of the traffic with respect to the landing zone and the elevator car. It should be appreciated the illustrated directions are merely those directions that are possible for the traffic and whether any traffic actually flows in the direction of the arrow is dependent on the destination, i.e. target landing zone, of the traffic, for example people.

In FIGS. 2a, 2b, 3a, 3b, 4a, 4b embodiments are illustrated by a cross-section of a doorway of an elevator viewed from above.

Figure 2A:
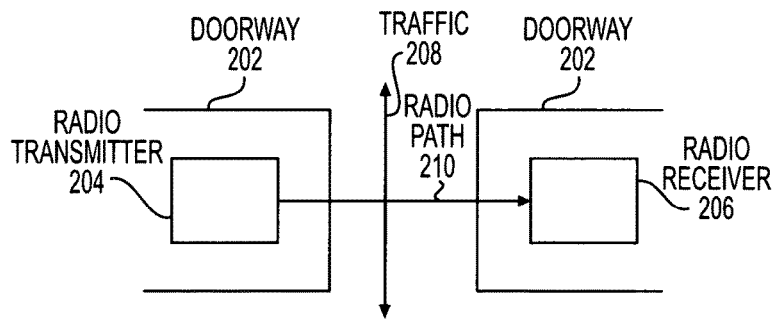
FIG. 2a illustrates a radio transmitter and a radio receiver installed to a doorway of an elevator according to an embodiment.

FIG. 2a illustrates a radio transmitter 204 and a radio receiver 206 installed to a doorway 202 of an elevator according to an embodiment. The elevator may correspond to the elevator of FIG. 1. The transmitter and receiver communicate by signals of the radio frequency portion of the electromagnetic spectrum. Accordingly, the transmitter and receiver form a radio path 210 for communications of radio signals on a radio frequency. The communicated radio signals may further characterize the radio path between the transmitter and the receiver by defining resources for the communications of the radio signal by a combination of one or more of time, frequency and code.

The transmitter and receiver may be arranged on opposite sides of the doorway according to the illustration, whereby a direct radio path 210 between the transmitter and the receiver is substantially perpendicular with a direction of traffic through a doorway between a landing zone and an elevator car.

Figure 2B:
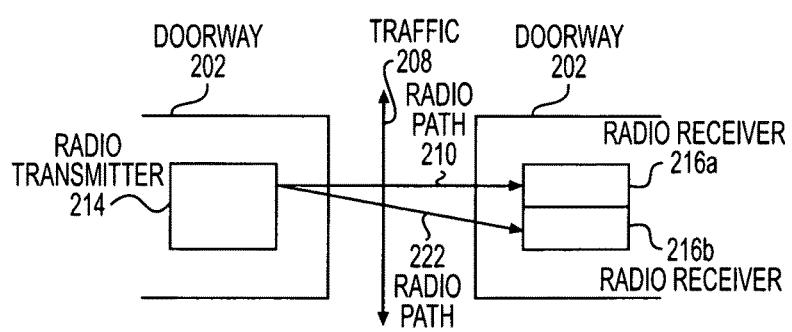
FIG. 2b illustrates a radio transmitter and a radio receiver installed to a doorway of an elevator and two spatially separate radio paths between them according to an embodiment.

FIG. 2b illustrates a radio transmitter 214 and radio receivers 216a, 216b installed to a doorway 202 of an elevator and two spatially separate radio paths 220, 222 between the radio receivers and the transmitter according to an embodiment. The doorway may be the doorway illustrated in FIG. 1. The radio paths are separated in the direction of the traffic 208. One 220 of the radio paths is substantially perpendicular with the direction the traffic and one of the radio paths is diverted from the perpendicular angle towards the direction of the traffic. The spatial separation may be provided by separating antennas of the receivers in the direction of the traffic. In one example, the distance of separation may be selected large enough to allow each of the radio paths to be obstructed by the traffic at a time. In this way unintentional obstructions of both radio paths may be prevented, which could follow from a crowded elevator car or landing zone.

Figure 3A:
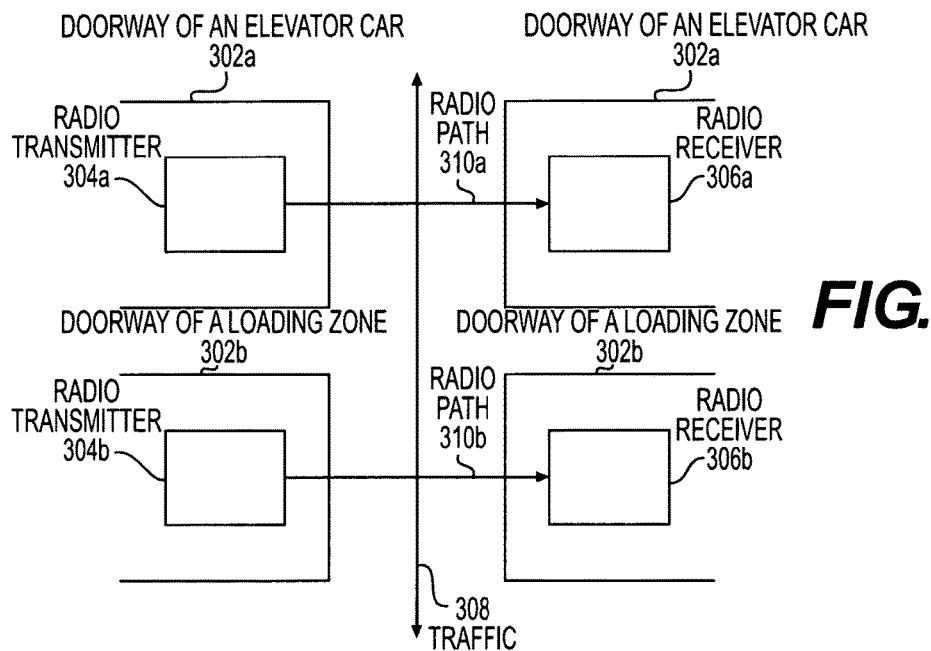
FIG. 3a illustrates radio transmitters and radio receivers installed to a doorway of an elevator and two spatially separate radio paths between the transmitters and the receivers according to an embodiment.

FIG. 3a illustrates radio transmitters 304a, 304b and radio receivers 306a, 306b installed to a doorway 302a, 302b of an elevator and two spatially separate radio paths 310a, 310b between the transmitters and the receivers according to an embodiment. The radio paths are arranged substantially perpendicular to the direction of the traffic. The doorway may be the doorway illustrated in FIG. 1. The doorway comprises a doorway of an elevator car 302a and a doorway of a landing zone 302b of the elevator. The transmitters and receivers may be arranged on opposite sides of the doorway similar to described in FIG. 2a for a pair of a transmitter and a receiver.

The radio paths are separated in the direction of the traffic 308. In FIG. 3a the separation is achieved by installing the transmitters and receivers to different parts of the doorway, which are separable in the direction of the traffic. Accordingly, in the in the illustration of FIG. 3a, the different parts of the doorway comprise the doorway of the elevator car and the doorway of the landing zone. In this way, the radio paths are separated from each other spatially at both ends. When radio paths are separated spatially at both ends, unintentional obstructions of the radio paths may be detected at both ends of the radio paths, i.e. sides of the doorway.

Figure 3B:
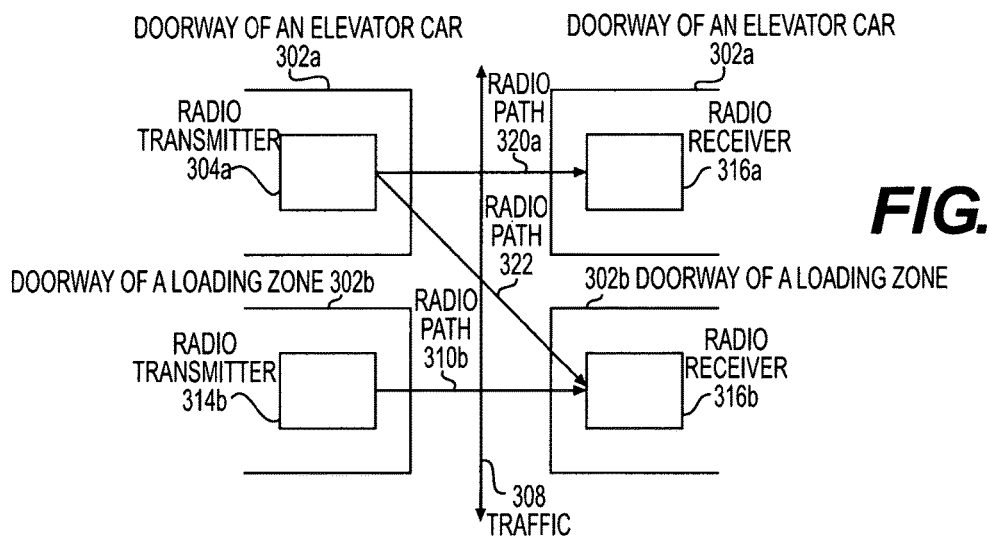
FIG. 3b illustrates radio transmitters and radio receivers installed to a doorway of an elevator and three spatially separate radio paths between the transmitters and the receivers according to an embodiment.

FIG. 3b illustrates radio transmitters 314a, 314b and radio receivers 316a, 316b installed to a doorway 302a, 302b of an elevator and three spatially separate radio paths 320a, 320b, 322 between the transmitters and the receivers according to an embodiment. The elevator may correspond to the elevator of FIG. 1. The spatial separation may be provided as explained with FIG. 3a above. As a difference to FIG. 3a, the receiver 316b receives radio signals from two spatially separate transmitters 314a and 314b. The radio path between the transmitter 314a and receiver 316a, and the radio path between the transmitter 314b and the receiver 316b are substantially perpendicular to the direction of the traffic 308. The third ratio path located between the transmitter 314a and receiver 316b is diverted from the perpendicular angle to the direction of the traffic, towards the direction of the traffic through the doorway.

Similar to explained with FIG. 3a above, the direct radio paths between the transmitter 314a and the receiver 316a, and the transmitter 314b and the receiver 316b, provide detection of unintentional obstructions. The third radio path provides diversity that improves accuracy in monitoring traffic of the doorway.

For example, people moving through the doorway to the same direction simultaneously in parallel, for example when boarding the elevator car, obstruct the direct radio paths a relatively short time compared to a time the third radio path is obstructed since it extends diagonally between the transmitter and the receiver. Accordingly, the diagonal radio path provides more information for detecting the direction of each traffic unit that passes through the doorway. In this way, the traffic, e.g. people, boarding and leaving the elevator car can be more accurately determined and used to control the elevator.

In one embodiment, all the radio paths in the doorway use different frequencies. Then, a receiver that communicates on two radio paths, for example the receiver 316b in FIG. 3b, may be implemented using a radio unit with operating frequencies corresponding to the radio paths. Such a multifrequency radio receivers may be implemented by dedicated radio frequency parts, per each frequency used. A single baseband processing part may be used to process the radio signals received on both radio paths.

Figure 4A:
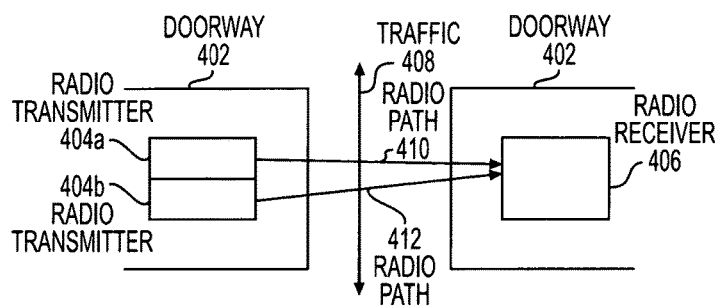
FIG. 4a illustrates radio transmitters and a radio receiver employing space-time block coding installed to a doorway of an elevator according to an embodiment.

FIG. 4a illustrates radio transmitters 404a, 404b and a radio receiver 406 installed to a doorway 402 of an elevator and employing space-time block coding according to an embodiment. Space—time block coding is a technique used in wireless communications to transmit multiple copies of a data stream across a number of antennas and to exploit the various received versions of the data. Accordingly, the space time block coding encodes the radio signal for transmission over spatially different radio paths 410, 412 to receive copies of the transmitted radio signal at different receivers. The transmitters may comprise antennas that are spatially separated in the direction 408 of traffic through the doorway, similar to the spatial separation described in FIG. 2b with receiver antennas. One 410 of the radio paths is substantially perpendicular to the direction of the traffic 408 through the doorway and the other ratio path is diverted from the perpendicular angle to the direction of the traffic, towards the direction of the traffic through the doorway. The transmitted radio signals are space-time block coded by the transmitter. The receiver receives the transmitted radio signals from both of the transmitters and decodes the received signals according to the used space-time coding scheme.

An example of the space-time coding scheme is Alamouti coding used in mobile communications, for example. The radio paths may be arranged with different angles towards the direction of traffic through the doorway to provide diversity in attenuation measurements when monitoring traffic through the doorway. The doorway may be formed by a doorway of an elevator car and a doorway of a landing zone, when the elevator car is at the landing zone and traffic may board of leave the elevator car.

Figure 4B:
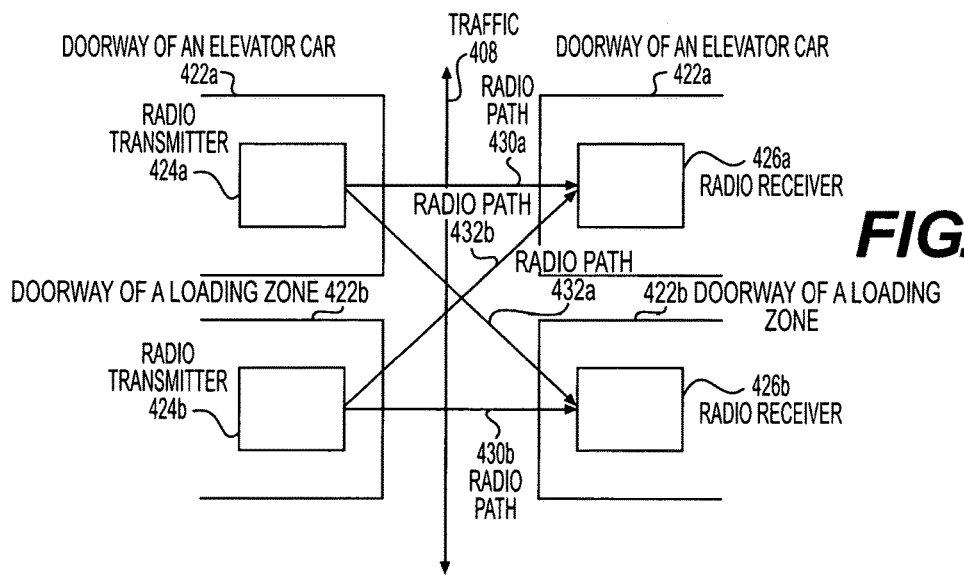
FIG. 4b illustrates radio transmitters and radio receivers employing space-time block coding installed to a doorway of an elevator according to an embodiment.

FIG. 4b illustrates radio transmitters 424a, 424b and radio receivers 426a, 426b installed to a doorway 422a, 422b of an elevator and employing space-time coding according to an embodiment. Similar to FIGS. 3a and 3b, the doorway comprises a doorway of an elevator car 422a and a doorway of a landing zone 422b of the elevator, whereby spatial separation is provided by the transmitters and receiver being installed to the doorway of the elevator car and the doorway of the landing zone that form the doorway of the elevator, when the elevator car is at the landing zone. The transmitters and receivers may communicate using a space-time block coding scheme as described with FIG. 4a. The space-time block coding provides reception at each of the receivers from both transmitters, thereby providing radio paths 430a and 430b that are arranged substantially perpendicular to a direction of the traffic and radio paths 432a, 432b that are arranged diverted towards the direction of the traffic from a perpendicular angle to the direction of the traffic. In this way further diversity may be provided to attenuation measurements of the radio signals across the doorway. This is especially beneficial, when the doorway is large compared to the traffic units, e.g. people, passing through the doorway, whereby the obstructions of the radio paths are more difficult to detect by attenuation measurements.

In a typical implementation of an embodiment, where a doorway of an elevator is equipped with at least two spatially separate radio paths that are substantially perpendicular a direction of traffic through the doorway, one or more radio paths are arranged to extends diagonally between them, according to the illustrations in FIGS. 3b and 4b. The diagonal radio paths provide more accuracy to the measurements and thereby enable more accurate monitoring of the traffic served by the elevator. When more accurate information of the traffic of the elevator is available, the elevator may be more efficiently controlled to serve the traffic. In this way waiting times in the landing zones may be kept acceptable with high-traffic situations and efficient utilization of the elevator capacity may be provided.

Figure 5:
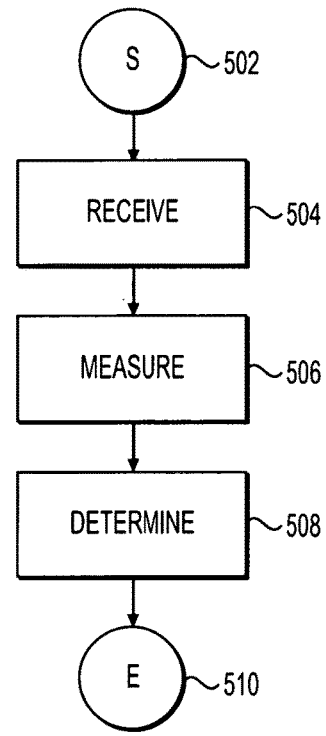
FIG. 5 illustrates a process of monitoring traffic of an elevator according to an embodiment.

FIG. 5 illustrates a process of monitoring traffic of an elevator according to an embodiment. The process may be used to monitor traffic of an elevator illustrated in FIG. 1, where one or more radio paths are arranged to a doorway of the elevator, as illustrated in any of the FIGS. 2a, 2b, 3a, 3b, 4a and 4b. The traffic monitoring may be used to control the elevator so that waiting times at the landing zones may be kept acceptable and the existing elevator resources are efficiently utilized.

The process starts in 502, where the elevator is operational and traffic, for example people may board and leave the elevator car.

In 504 radio signals are communicated on spatially separated radio paths across the doorway. The communications may comprise receiving a radio signal on one or more of the radio paths. The radio paths may use the same or different frequencies for communications. In one example the frequency used for communications is on a frequency band reserved for Industrial Scientific and Medical purposes, for example the ISM frequency band conventionally located on the 2.4 GHz frequency band. The transmitted radio signals may be coded, for example using space-time block coding, whereby the received radio signals are decoded according to the coding scheme used in the transmitter to obtain the data symbols from the transmitter communicating on the specific radio path.

A variety of communications technologies and standards may be used for communicating the radio signals. Examples of these include but are not limited to the Institute of Electrical and Electronics Engineers (IEEE) 802.11 based Wireless Local Area Networks, Bluetooth and ZigBee. Currently the latest version of IEEE 802.11 WLAN standards is defined by the IEEE in a revision of Revision of IEEE Std 802.11-2007, dated 29 Mar. 2012: Part 11: Wireless LAN Medium Access Control (MAC) and Physical Layer (PHY) Specifications.

In 506 signal strength of one or more received radio signals are measured. In this way a value for signal strength is obtained from a radio signal transmitted on a specific radio path across the doorway. The signal strength may be measured in Watts, dB, dBm and/or a signal strength indicator may be formed, for example Received Signal Strength Indicator. RSSI may be readily available, example when commercially available WLAN adapters are used to implement the radio path of an embodiment.

In 508 traffic served by the elevator may be determined on the basis of the measured one or more signal strengths. For traffic comprising people, a statistically formed predefined value for an attenuation caused by a person to a radio signal may be used to determine a number of persons blocking the radio signal between a transmitter and a receiver. The determining may include measuring an attenuation of the radio signal and comparing the measured attenuation to signal strength of an unobstructed radio signal. When the attenuation exceeds a threshold for the value of the attenuation corresponding to a single person, it may be determined that a single person is obstructing the radio path. When the attenuation exceeds further thresholds, further people may be determined to be blocking the radio path.

In an embodiment, traffic boarding the elevator car may be determined by a counter that is incremented on the basis of a number of persons determined to be obstructing a radio path. Each radio path may have its own counter. The counter may be incremented during a stoppage of the elevator car at a landing zone.

In an embodiment a counter may be triggered on the basis of a time duration of attenuation exceeding a threshold. The threshold may be set higher for a radio path that is diverted from a perpendicular angle to a direction of the traffic through the doorway, than for a radio path that is substantially perpendicular across the doorway. For example, the counters of radio paths that are diagonal between the direct radio paths across the doorway in FIG. 4b may have higher thresholds for duration of the attenuation than the direct radio paths.

The higher threshold for the duration of the attenuation provides detecting, when more than one person is going through the doorway simultaneously in parallel to the same direction, since the persons attenuate the radio signal of the diagonal path for a longer period of time than the radio signal of the direct path. When the counter for the diagonal radio path is triggered, the number of people may be determined on the basis of the attenuation measured over the triggered time period exceeding a threshold for the attenuation. In this way traffic monitoring accuracy of using one or more perpendicular radio paths may be improved using also a diagonal radio path across the doorway.

A counter may include thresholds for both a value of the attenuation and the duration of the attenuation, whereby the counter may be triggered, i.e. one or more persons are detected, only when a threshold for the amount of attenuation corresponding to the number of persons has been exceeded for a time period also exceeding the threshold for the duration. It should be appreciated that since there may be more than one threshold for the value of the attenuation, the increase of the counter may be determined from the number of persons corresponding to the threshold for the attenuation, when the threshold for the attenuation has been exceeded for a threshold for the duration of time.

The process ends in 510, where traffic through the doorway has been determined. It should be appreciated that the above process may be repeated for each landing zone, when the elevator car stops there. In this way traffic of the elevator may be monitored with respect to traffic per landing zone, traffic between different landing zones and total traffic served by the elevator.

In an embodiment an origin-destination matrix is constructed on the basis of the measured traffic according to the process of FIG. 5. In the origin destination matrix, each element of the matrix corresponds to the number of passengers travelling from a given origin to a given destination per time unit The origin and destination may be defined by the landing zones of the elevator. The time unit may be time, an hour, a day or a week, for example. The origin-destination matrix may be used in traffic forecasting for controlling operation of one or more elevators. Based on the forecasting, elevators may be removed from operation to save power, or they may be controlled to serve traffic of those landing zones that have heavy traffic at a specific time.

Figure 6:
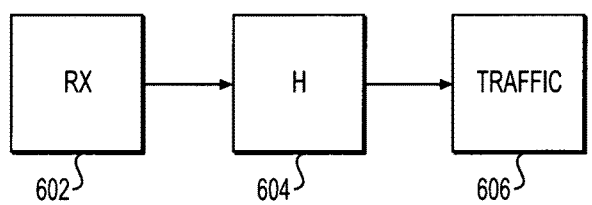
FIG. 6 illustrates functional blocks of an apparatus according to an embodiment.

FIG. 6 illustrates functional blocks of an apparatus according to an embodiment. The functional block provides traffic monitoring of an elevator, for example an elevator illustrate in FIG. 1. The functional blocks illustrate processing of information of radio signal strengths obtained from a measurement setup over one or more radio paths as illustrated in FIGS. 2a, 2b, 3a, 3b, 4a and 4b. The blocks may be executed by an elevator control system that is connected an elevator according to an embodiment.

Receiver 602 obtains signal strength values of radio signals communicated on one or more radio paths across a doorway of the elevator. The signal strength values may comprise an indicator of signal strength, for example an RSSI value.

The filter 604 processes the received signal strengths into counter values. Each radio path may have its own counter that is incremented when a threshold for a value of attenuation of signal strength on that path is exceeded. The threshold for attenuation may be set on the basis of statistical information of attenuation caused by a unit of traffic, e.g. a person, to the radio signal on the radio path. Since the attenuation increases with increasing number of traffic units, further thresholds may be defined above the first threshold to determine an increase of the counter with a value corresponding to the number of traffic units.

A further triggering condition may be defined for the counter. The counter may be further defined to trigger, when attenuation exceeding the threshold for the attenuation has lasted over a threshold for a duration of the attenuation.

In an embodiment a counter for a radio path that is diverted from a perpendicular angle to a direction of traffic through the doorway, has a higher threshold for time before being incremented for the attenuation on the radio path exceeding a threshold than a radio path that is perpendicular to a direction of the traffic through the doorway. The number of traffic units that obstruct the diverted radio path may be then determined as explained above using thresholds for attenuation values.

A traffic determiner 606 receives the counter information from the filter unit and determines traffic in units that boarded and/left the elevator car, when the elevator was stopped at the landing zone. The traffic converter may store the determined information to be combined with information derived by the filter from further stops of the elevator car at the landing zone. The information of traffic units may be stored with a time stamp so that the observed traffic can be used in traffic forecasting for a specific time period, e.g. an hour, a day or a week.

The above described functional blocks may be executed per each landing zone and per each stoppage of an elevator car to a landing zone. In this way counter information may be obtained per each landing zone to form an origin-destination matrix.

Figure 7:
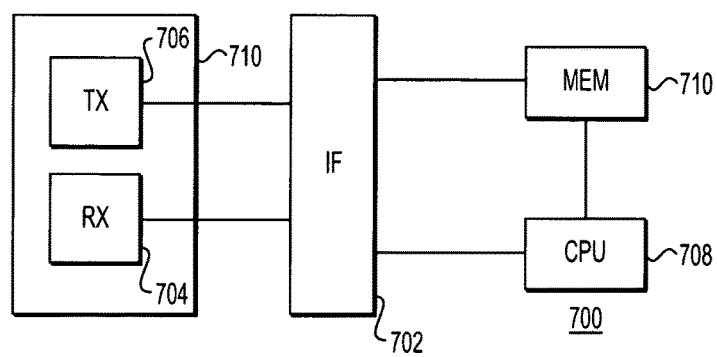
FIG. 7 illustrates a block diagram of an apparatus according to an embodiment.

FIG. 7 illustrates a block diagram of an apparatus 700 according to an embodiment. Although the apparatus has been depicted as one entity, different modules and memory may be implemented in one or more physical or logical entities. The apparatus may comprise a control system of an elevator that is connected to an arrangement of one or more transmitters and receivers installed to a doorway of an elevator, for example the elevator described in FIG. 1. FIG. 6 illustrates functional blocks, one or more of which may be implemented in the apparatus, for example in computer program code. The apparatus may be installed to an elevator car of the elevator, for example.

The apparatus 700 comprises an interfacing unit 702, a central processing unit (CPU) 708, and a memory 710, that are all being electrically interconnected. The interfacing unit is connected to an input 704 and an output unit 706 that provide, respectively, the input and output interfaces to the apparatus. The memory may comprise one or more applications that are executable by the CPU. The input and output units may be configured or arranged to send and receive a radio frequency signal comprising data, frames, packets and/or messages according to one or more wired or wireless communications protocols. Examples of the protocols comprise IEEE 802.11 Wireless Local Area Network, ZigBee and Bluetoot for example. The input unit may correspond with a radio receiver as illustrated in an embodiment and the output unit may correspond with a radio transmitter described in the above embodiments.

The input and output units may be installed to a doorway of an elevator, such as the elevator illustrated in FIG. 1.

Different parts of the apparatus 700 may be combined into a single unit to provide the functionality of the parts. Accordingly, the input 704 and output units 706 may be combined into a single unit providing the reception 3o and sending of radio signals.

It should be appreciated that it is feasible to communicate radio signals across the doorway also with the input and output units combined or being located on the same side of the doorway, for example by a reflector placed on a side of the doorway opposite to the output unit. In this way the radio signals transmitted by the output unit are reflected back to the side of the doorway, where the input unit is located together with the output unit.

In an embodiment the input unit 704 may provide circuitry for obtaining radio signals, data, frames, packets and/or messages to the apparatus. The obtaining may comprise receiving radio frequency signals by an antenna, for example. In another example the obtaining by the input unit may comprise receiving an electrical signal on a wired connection.

In an embodiment the output unit 706 may provide circuitry for transmitting radio signals, data, frames, packets and/or messages from the apparatus. The transmitting may comprise transmitting radio frequency signals by an antenna, for example. In another example the transmitting may comprise transmitting an electrical signal on a wired connection.

The apparatus 700 may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions. The memory may be a volatile or a non-volatile memory, for example EEPROM, ROM, PROM, RAM, DRAM, SRAM, firmware, programmable logic, etc.

An embodiment provides a computer program embodied on a distribution medium, comprising program instructions which, when loaded into an electronic apparatus, constitute the functionality according to an embodiment.

The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The apparatus 700 may also be implemented as one or more integrated circuits, such as application-specific integrated circuits ASIC. Other hardware embodiments are also feasible, such as a circuit built of separate logic components. A hybrid of these different implementations is also feasible.

An embodiment concerns updating of existing elevators to enable traffic monitoring. The updating may comprise updating an existing elevator which may include landing zones and an elevator car moving between the landing zones as illustrated in FIG. 1. The elevator may have a control system that controls the operation of the elevator.

The existing elevator may be updated by installing one or more of a transmitter and one or more of a receiver to a doorway of an elevator to communicate across the doorway on spatially separated radio paths, for example as described various embodiments described above. The so updated elevator may provide a functionality of an embodiment by software, hardware or a combination of software and hardware installed to the elevator, for example installed to an elevator control system. Accordingly, the one or more of a transmitter and one or more of a receiver may be a part of the elevator control system.

The steps/points, and related functions described above in FIG. 4 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

The present invention is applicable to an elevator and/or to any vehicle of combination of different vehicles that move loads for example people and cargo between an origin and a destination. All words and expressions should be interpreted broadly and they are intended to illustrate, not to restrict, the described embodiments.

Apparatuses, such as an elevator and/or to any vehicle of combination of different vehicles that move loads for example people and cargo between an origin and a destination, or apparatuses implementing the functionality of a corresponding apparatus described with an embodiment, comprise not only prior art means, but also means for receiving radio signals communicated on spatially separated radio paths across a doorway of an elevator, measuring signal strength of the radio signals, and determining traffic served by the elevator on the basis of the measured signal strengths.

More precisely, the various means comprise means for implementing functionality of a corresponding apparatus described with an embodiment and it may comprise separate means for each separate function, or means may be configured to perform two or more functions. Present apparatuses comprise processors and memory that can be utilized in an embodiment. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus.

For example, an apparatus according to an embodiment may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
   receiving radio signals communicated on spatially separated radio paths across a doorway of an elevator;
   measuring signal strength of the radio signals; and
   determining a quantity of traffic units served by the elevator based on a determined amount of attenuation of the measured signal strengths.

2. A method according to claim 1, wherein the spatially separate radio paths are separated in a direction of traffic through the doorway.

3. A method according to claim 1, wherein the spatially separate radio paths are at different angles to a direction of traffic through the doorway.

4. A method according to claim 1, wherein at least one radio path is diverted from a perpendicular angle to a direction of traffic through the doorway, and at least one radio path is arranged substantially perpendicular to the direction of traffic.

5. A method according to claim 1, wherein the spatially separate radio paths comprise at least two radio paths arranged substantially perpendicular to a direction of traffic through the doorway.

6. A method according to claim 1, wherein the spatially separate radio paths include
   at least one radio path diverted from a perpendicular angle to a direction of traffic through the doorway, and
   at least two radio paths arranged substantially perpendicular to the direction of traffic through the doorway,
   wherein the diverted radio path is between the at least two radio paths.

7. A method according to claim 1, the determining including
   measuring an attenuation of a signal strength of a radio path of the spatially separate radio paths;
   determining a particular quantity of traffic units on the radio path based on a determination that the attenuation exceeds a threshold corresponding to the particular quantity of traffic units.

8. A method according to claim 7, wherein the particular quantity of traffic units on the radio path is determined based on a magnitude of the attenuation exceeding the threshold for a time period that exceeds a time threshold.

9. A method according to claim 1, wherein
   the spatially separate radio paths are separated spatially by at least transmitters or receivers of the radio paths, the transmitters or receivers installed to different parts of the doorway, and
   the doorway includes a doorway of an elevator car and a doorway of an elevator landing zone.

10. A method according to claim 1, wherein the spatially separate radio signals comprise space-time block coded radio signals.

11. An arrangement for monitoring traffic of an elevator, the arrangement comprising
    a doorway of an elevator, and at least one radio transmitter and at least one radio receiver configured to communicate across the doorway on spatially separated radio paths,
    wherein the arrangement is configured to perform the method according to claim 1.

12. An arrangement according to claim 11, wherein the arrangement include at least one element selected of an elevator car, and an elevator landing zone.

13. An arrangement according to claim 11, wherein the doorway of the elevator includes a doorway of an elevator landing zone and a doorway of an elevator car, each doorway of the doorway of the elevator landing zone and the doorway of the elevator car including at least one radio transmitter and at least one radio receiver.

14. An arrangement according to 11, wherein the at least one radio receiver is configured to perform spatial decoding of received radio signals.

15. An arrangement according to claim 11, comprising an antenna array of at least two antennas separated in a direction of traffic through the doorway, the at least two antennas configured to provide spatial separation of radio signals received from at least one transmitter.

16. A method of updating an elevator, said method comprising installing the arrangement according to claim 11 to the elevator.

17. A computer program product comprising executable code that when executed, cause execution of functions of the method according claim 1.

* * * * *